United States Patent [19]
Feldtkeller

[11] Patent Number: 6,160,385
[45] Date of Patent: Dec. 12, 2000

[54] CIRCUIT CONFIGURATION FOR PRODUCING A LOAD-INDEPENDENT OUTPUT VOLTAGE

[75] Inventor: Martin Feldtkeller, München, Germany

[73] Assignee: Siemens Aktiengesellschaft, Munich, Germany

[21] Appl. No.: 09/408,682

[22] Filed: Sep. 30, 1999

[30] Foreign Application Priority Data

Sep. 30, 1998 [DE] Germany .................. 198 44 952

[51] Int. Cl.⁷ .................. G05F 1/40; G05F 1/44; H02M 7/68
[52] U.S. Cl. .................. 323/222; 323/284; 363/89; 363/127
[58] Field of Search .................. 323/222, 282, 323/285, 284; 363/21, 89, 127, 124

[56] References Cited

U.S. PATENT DOCUMENTS

| | | | |
|---|---|---|---|
| 4,437,146 | 3/1984 | Carpenter | 363/79 |
| 4,940,929 | 7/1990 | Williams | 323/222 |
| 5,572,416 | 11/1996 | Jacobs et al. | 363/89 |
| 5,602,465 | 2/1997 | Clemente | 323/300 |
| 5,619,405 | 4/1997 | Kammiller et al. | 323/222 |
| 5,867,379 | 2/1999 | Maksimovic et al. | 363/89 |
| 5,959,852 | 9/1999 | Deloy et al. | 323/222 |

*Primary Examiner*—Edward H. Tsu
*Assistant Examiner*—Bao Q. Vu
*Attorney, Agent, or Firm*—Herbert L. Lerner; Laurence A. Greenberg; Werner H. Stemer

[57] ABSTRACT

The circuit configuration provides an at least approximately load-independent DC voltage. The circuit includes a current control assembly for controlling the mains current consumption, having an AC voltage terminal at which the mains voltage is received and two output terminals. A rectifier assembly is connected to the output terminals of the current control assembly and has output terminals to which the DC voltage is applied. A voltage measurement arrangement, for providing a voltage signal at an output terminal is connected to the output terminals of the rectifier assembly. A feedback branch has a voltage control assembly for feeding the voltage signal back to the current control assembly.

14 Claims, 2 Drawing Sheets

CIRCUIT CONFIGURATION FOR PRODUCING A LOAD-INDEPENDENT OUTPUT VOLTAGE

BACKGROUND OF THE INVENTION

FIELD OF THE INVENTION

The invention lies in the electrical and electronic arts. More specifically, the invention relates to a circuit configuration for providing a substantially load-independent output voltage, having the following features:

a current control assembly for controlling the mains current consumption, having an AC voltage terminal for applying a mains voltage and having two output terminals;

a rectifier assembly which is connected to the output terminals of the current control assembly and has output terminals to which the output voltage is applied;

a voltage measurement arrangement, for providing a voltage signal at an output terminal, which is connected to the output terminals of the rectifier assembly;

a feedback branch having a voltage control arrangement for feeding the voltage signal back to the current control assembly.

Such circuit configurations, also referred to as "power factor controllers," are used for example in switched mode power supplies. As the load, a chopper-type regulator, for supplying a consumer with a DC voltage, is in this case connected to the output terminals of the rectifier assembly. The object of the circuit configuration according to the generic type is thereby to make the output voltage available as a DC voltage at least approximately load-independently and with as sinusoidal a mains current consumption as possible. The requirement for sinusoidal mains current consumption by such switched mode power supplies is regulated in Europe, for example, by an EC regulation that power supplies, for example for computers, with a power consumption of more than 75 W must guarantee a mains current consumption with a sinusoidal shape corresponding to the mains voltage.

The task of the current control assembly is, on the one hand, to create sinusoidal mains current consumption through its input terminals and, on the other hand, to control the power delivered at its output terminals to the rectifier assembly in such a way that as constant a DC voltage as possible is applied as the output voltage to the output terminals of the rectifier assembly, this voltage remaining as stable as possible even when the load fluctuates. The voltage measurement arrangement connected between the output terminals of the rectifier assembly produces, from this DC voltage, a voltage signal which is dependent on the latter and is fed back to the current control assembly via the feedback branch. A control signal, fed back to the current control assembly and applied to the output of the feedback branch, is used to adjust the mains current consumption, or power consumption, when there are fluctuations in the DC voltage due to the load, until the predetermined value of the output voltage is obtained.

The output voltage applied to the output terminals of the rectifier assembly is not an ideal DC voltage, but has residual ripple whose frequency depends on the frequency of the mains voltage.

In order to prevent the ripple of the output voltage, or of the voltage signal, from being fed back to the current control assembly, in known circuit configurations of the generic type the voltage control arrangement present in the feedback branch has an integrator with a time constant which is large compared with the period of the mains voltage.

Integrating the voltage signal, or a signal representing the difference between the voltage signal and a reference signal, over a comparatively long time window does, however, have the disadvantage that, owing to the time constant of the integrator, sudden load changes and sudden changes in the output voltage which result from this are only detected with a time lag by the current control assembly. Especially at times when there is no load at all, there is a risk that the circuit configuration will be destroyed during this time lag by the inevitable rise in the output voltage, unless extra circuitry for limiting the output voltage is employed.

SUMMARY OF THE INVENTION

It is accordingly an object of the invention to provide a circuit configuration, which overcomes the above-mentioned disadvantages of the heretofore-known devices and methods of this general type and which outputs a substantially load-independent output voltage, which reacts rapidly to load changes, and for which no extra circuitry is needed for start-up protection.

With the foregoing and other objects in view there is provided, in accordance with the invention, a circuit configuration for providing a substantially load-independent output voltage, comprising:

a current control assembly for controlling a mains current consumption, the current control assembly having an AC voltage terminal for receiving a mains voltage and having two output terminals;

a rectifier assembly connected to the output terminals of the current control assembly, the rectifier assembly having output terminals carrying an output voltage;

a voltage measurement arrangement connected to the output terminals of the rectifier assembly, the voltage measurement arrangement having an output terminal outputting a voltage signal; and a feedback branch having a voltage control arrangement connected between the output terminal of the voltage measurement arrangement and the current control assembly for feeding the voltage signal to the current control assembly, the voltage control arrangement including a sample and hold circuit for evaluating the voltage signal during predeterminable sampling intervals.

In other words, the above objects are satisfied with the circuit configuration in which the voltage control arrangement of the feedback branch has a sample and hold circuit for evaluating the voltage signal during predeterminable sampling intervals.

The sampling intervals are in this case preferably periodic and, in addition, synchronous with the residual ripple of the output voltage, or of the voltage signal, the frequency of the residual ripple depending on the frequency of the mains voltage. The duration of the sampling intervals is preferably short compared with the period of the residual ripple, or of the mains voltage. During the short sampling intervals, the voltage signal is subject to only very small fluctuations, which result from the ripple of the voltage signal, the fluctuations decreasing as the duration of the sampling intervals decreases. Since, in addition, the sampling of the voltage signal takes place periodically and synchronously with the ripple, a control signal which is formed by means of the sample and hold circuit from the voltage signal, and is fed to the current control assembly, has almost no ripple resulting from the residual ripple of the output voltage. It is therefore possible to avoid using an integrator with a large time constant for smoothing the output signal of the sample and hold circuit. The current control assembly therefore reacts very rapidly to, and compensates for, changes in the output voltage.

In accordance with an added feature of the invention, the sample and hold circuit has a linear amplifier with a switchable output. In this case, the amplifier compares the voltage signal during the sampling intervals with a first reference signal, an output signal on the amplifier changing only during the sampling intervals and remaining constant between the sampling intervals.

In accordance with an additional feature of the invention, therefore, a temporal position and a duration of the sampling intervals is dependent on the mains voltage.

In accordance with another feature of the invention, a duration of the sampling intervals is short compared with a period of the mains voltage.

In accordance with a further feature of the invention, the voltage control arrangement includes an amplifier with a switchable output.

In accordance with again an added feature of the invention, the voltage control arrangement includes an operational amplifier having input terminals receiving the voltage signal and a first reference signal, respectively, and the voltage control arrangement further includes a control circuit connected to and driving the operational amplifier at a control connection thereof. In accordance with a further development, the control circuit is a comparator having input terminals receiving a signal dependent on the mains voltage and a second reference signal, respectively, and an output terminal connected to the control connection of the operational amplifier.

In this embodiment the operational amplifier has the voltage signal applied to its inverting input and the first reference signal applied to its non-inverting input. The operational amplifier is thereby driven using the comparator whose output is connected to a control input of the operational amplifier. A signal dependent on the mains voltage is in this case applied to the inverting input of the comparator, and a second reference signal is applied to the non-inverting input of the comparator. In this case, the comparator generates the sampling intervals, during which the operational amplifier evaluates the voltage signal by comparing it with the first reference signal.

The operational amplifier is, in particular, designed as an "operational transconductance amplifier" (OTA). Such OTAs have the property that an imposed current which is proportional to the difference in the voltage applied between the input terminals is made available at its output, the proportionality factor depending on the signal applied to the control input. The integrating behavior required, in this embodiment, of the voltage control arrangement is, for example, obtained by connecting a capacitor downstream of the output terminal of the operational amplifier.

In accordance with again a further feature of the invention, an RC network is connected upstream of an input terminal of the operational amplifier. Preferably, the RC network is connected to form a part of the voltage measurement arrangement between an output terminal of the rectifier assembly and the input terminal of the operational amplifier receiving the voltage signal.

In accordance with again a further feature of the invention, an RC network connected downstream of an output terminal of the operational amplifier.

In accordance with yet an added feature of the invention, a capacitor is connected as a holding element downstream of an output terminal of the operational amplifier. Preferably, the capacitor is connected between the output terminal and a reference potential. Also, the capacitor may be connected in series with the RC network between the output terminal and the reference potential.

In other words, an RC network is connected upstream of the inverting input of the operational amplifier and/or an RC network is connected downstream of the output of the operational amplifier. This external circuitry of the operational amplifier affects the transfer behavior of the voltage control arrangement, it being possible for the transfer function of the voltage control arrangement to be affected by the RC network, when the individual components of the network are dimensioned suitably, in such a way that the control arrangement operates stably for the frequency ranges encountered in the fluctuations in the voltage signal.

The present invention further relates to the implementation of the above-outlined circuit configuration in a switched mode power supply.

Other features which are considered as characteristic for the invention are set forth in the appended claims.

Although the invention is illustrated and described herein as embodied in a circuit configuration-for producing a load-independent output voltage, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
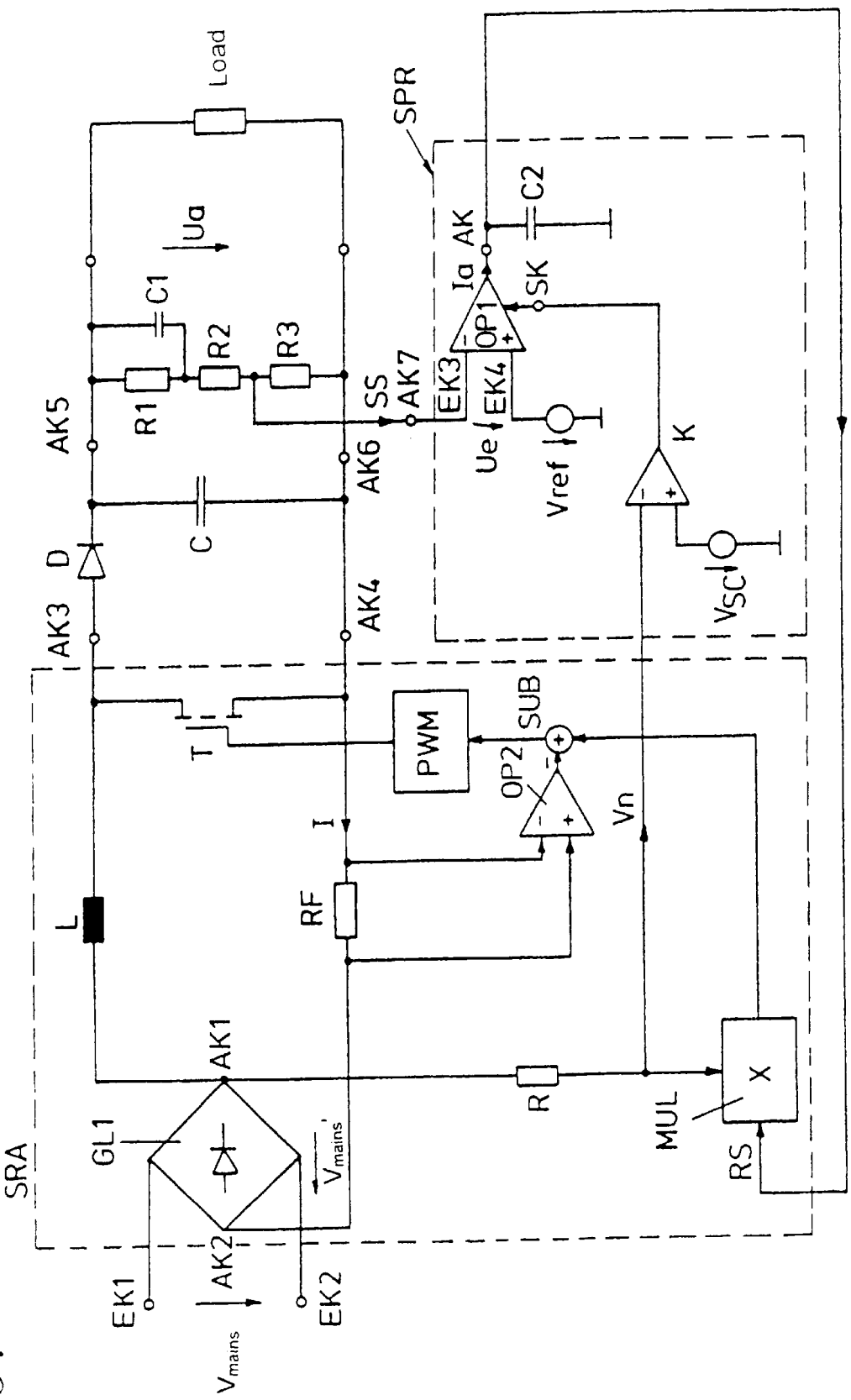
Figure 2:
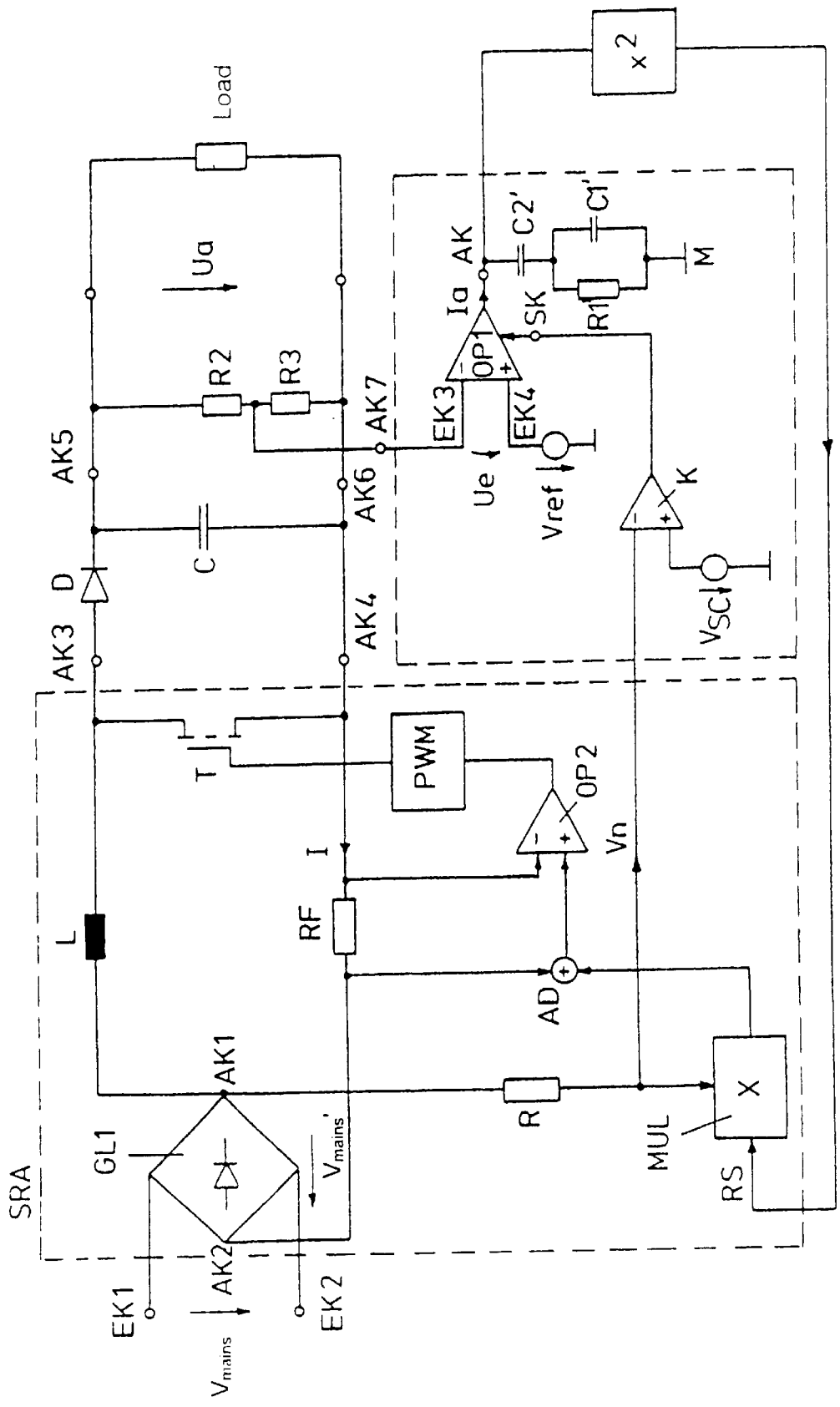

FIG. 1 is a schematic circuit diagram showing a first embodiment of the circuit configuration according to the invention; and FIG. 2 is a schematic circuit diagram of a second embodiment of the circuit configuration according to the invention.

DESCRIPTION OF THE PREFERRED EMBODIMENTS

Referring now to the figures of the drawing in detail and first, particularly, to FIG. 1 thereof, there is seen a FIG. 1 shows a circuit configuration according to the invention for providing an at least approximately load-independent output voltage Ua for a load. The circuit configuration has a current control assembly SRA for controlling the mains current consumption, having an AC voltage terminal EK1, EK2 for applying a mains voltage $V_{mains}$ and having two output terminals AK3, AK4, to which a rectifier assembly D, C is connected. The output voltage Ua is applied between output terminals AK5, AK6 of the rectifier assembly D, C, to which the load can be connected. The load, represented purely by way of example as a resistor in the illustrative embodiment, may be virtually any desired load, in particular a chopper-type regulator of a switched mode power supply.

In order to measure the DC voltage Ua, a voltage measurement arrangement is connected between the output terminals AK5, AK6 of the rectifier assembly D, C, it being possible to tap a voltage signal SS dependent on the output voltage Ua at an output terminal AK7 of the voltage measurement arrangement. In the simplest case, this voltage measurement arrangement consists of a voltage divider. The circuit configuration further has a feedback branch with a voltage control arrangement SPR for feeding the voltage signal SS back to the current control assembly SRA, a control signal RS fed to the current control assembly being applied at the output of the feedback branch.

The object of the current control assembly SRA is, on the one hand, to guarantee sinusoidal mains current consumption corresponding to the mains voltage $V_{mains}$ and, on the other hand, to control the power delivered to the rectifier assembly D, C in such a way that the DC voltage Ua remains at least approximately constant, or is corrected rapidly, when the load fluctuates. In the illustrative embodiment represented, the current control assembly SRA has a bridge rectifier GL1, which is connected to the AC voltage connection EK1, EK2 and between whose output terminals AK1, AK2 a rectified-sinusoidal voltage $V_{mains}'$ corresponding to the magnitude of the mains voltage $V_{mains}$ is applied. The current control assembly SRA further has a semiconductor switch T, whose load is connected between the output terminals AK3, AK4 of the current control assembly SRA and which is opened or closed under the control of a pulse width modulator PWM. An inductor L, connected between the output terminal AK1 of the bridge rectifier GL1 and the output terminal AK3 of the current control assembly SRA, stores energy when the semiconductor switch T is closed and releases it to the rectifier assembly D, C when the semiconductor switch T is opened. The energy stored by the inductor L is in this case commensurately greater, the longer the semiconductor switch T is closed, the drive intervals of the semiconductor switch being small compared with the period of the mains voltage $V_{mains}$ and the voltage $V_{mains}'$.

The pulse width modulator PWM is part of a control circuit for creating sinusoidal mains current consumption, a subtracter SUB as well as an operational amplifier OP2 being connected upstream of the pulse width modulator PWM. In this case, via a current sensing resistor RF connected in series with one of the output terminals AK2 of the bridge rectifier GL1, the operational amplifier OP2 draws a voltage signal which is proportional to the current I that corresponds to the magnitude of the mains current consumed. This signal is in this case subtracted from a rectified-sinusoidal signal which is formed by multiplying a rectified-sinusoidal signal Vn by the control signal RS, the signal Vn depending on the voltage $V_{mains}'$ that can be tapped in between the output terminals AK1, AK2 of the bridge rectifier GL1. The multiplication is carried out using a multiplier MUL, to whose input terminals the two signals Vn and RF are fed. The output signal of the subtracter SUB is fed to the pulse width modulator PWM, the drive pulses generated at periodic time intervals by the pulse width modulator PWM in order to drive the semiconductor switch T being commensurately longer, the greater the output signal of the subtracter SUB is. Under constant load, an approximately constant signal is obtained at the output of the subtracter SUB. The signal that can be tapped via the current sensing resistor RF is then at least approximately rectified-sinusoidal, the same being true as regards the current I. This results in sinusoidal current consumption.

Changes in loads at the output terminals of the rectifier assembly D, C lead to changes in the control signal RS fed to the current control assembly SRA via the feedback branch, for example a falling load causing a decreasing control signal RS and therefore a decreasing output signal of the subtracter SUB. Through this, by turning on the semiconductor switch T for relatively short periods of time, the power consumption is adjusted in order to keep the output voltage Ua approximately constant.

The output voltage Ua has a residual ripple whose frequency depends on the frequency of the mains voltage $V_{mains}$. The current signal SS formed by the current measurement arrangement has a corresponding ripple. The residual ripple results from the power flow in the circuit. The instantaneous power drawn by the circuit is found from the product of the current I drawn by the current control assembly SRA multiplied by the mains voltage $V_{mains}$. Since both of these values are sinusoidal with the same phase angle, a sin 2 function is found for the power instantaneously drawn and delivered to the rectifier assembly. In this case, the load consumes constant power as function of time, the magnitude of which corresponds to the mean of the $sin^2$ function of the instantaneous power. The fluctuations in the power flow, given by the difference between the instantaneous power and the power consumed by the load, have to be compensated for by the capacitor C of the rectifier assembly, with its energy content fluctuating periodically. The effect of this is to create a periodic fluctuation, or ripple, in the output voltage Ua. The period of the fluctuations in the output voltage corresponds to the period of the $sin^2$ function of the instantaneous power, and is therefore dependent on the mains frequency. The frequency of the fluctuations corresponds to twice the mains frequency.

In order to prevent the ripple of the output voltage Ua, and therefore the voltage signal SS, from being fed back to the current control assembly SRA, and there leading to distortions in the mains current consumption, the circuit configuration according to the invention provides a voltage controller SPR which is fitted in the feedback branch and has a sample and hold component or a sample and hold circuit. The voltage controller SPR represented in FIG. 1 has an operational amplifier OP1 having an input terminal EK3, to which the voltage signal SS is fed, and having an input terminal EK4 to which a first reference signal $V_{ref}$ is applied. The operational amplifier OP1, which is preferably designed as an "operational transconductance amplifier", is driven by a comparator K which compares the rectified-sinusoidal signal Vn, dependent on the rectified-sinusoidal voltage $V_{mains}'$ that can be tapped at the output terminal AK1 of the bridge rectifier GL1, with a second reference signal Vsc. An output of the comparator K is in this case connected to a control input SK of the operational amplifier OP1.

The operational amplifier OP1 delivers at an output terminal AK a current Ia which is proportional to an input voltage Ue applied between the voltage terminals EK3, EK4, this input voltage Ue being found as the difference between the voltage signal SS and the first reference signal Vref. The factor of proportionality between the output current Ia and the input voltage Ue is in this case dependent on the signal applied to the control input SK. In the way, represented in the present illustrative embodiment, of driving the operational amplifier OP1 using a comparator K, a predefined proportionality factor is obtained whenever a high level is applied at the output of the comparator K, and a proportionality factor of 0 whenever a low level is applied at the output of the comparator K.

The high level at the output of the comparator K in this case sets the sampling intervals during which the operational amplifier OP1 evaluates the voltage signal SS. The sampling intervals are in this case determined by the time intervals in which the rectified-sinusoidal signal Vn, which has twice the mains frequency, falls below the value of the second reference signal Vsc. The sample intervals therefore recur at twice the mains frequency. The second reference signal Vsc is in this case selected in such a way that the duration of the sampling intervals is small compared with the period of the rectified-sine function Vn. Since the fluctuations in the output voltage Ua, or in the voltage signal SS, also have twice the mains frequency, and therefore the same frequency as the rectified-sinusoidal signal Vn, evaluation of the voltage signal SS always takes place in equal time intervals relevant to the period of the fluctuations in the output voltage Ua or in the voltage signal SS.

During the short sampling intervals, chosen to be synchronous with the fluctuations in the voltage signal SS, the voltage signal SS is subject to only small fluctuations which result from the residual ripple and are substantially smaller than the periodic fluctuations in the voltage signal SS over the total period which are due to the residual ripple of the output voltage Ua.

During the sampling intervals, a current Ia flows to a capacitor C2 connected downstream of the output terminal AK of the operational amplifier OP1, this current Ia depending on the difference between the voltage signal SS and the first reference signal Vref. Between the sampling intervals, in the illustrative embodiment represented, no output current Ia flows, and the control signal RS, which can be tapped via the capacitor C2 and is fed to the current control assembly SRA, does not change between the sampling intervals. The capacitor C2 has an integrating function. The control signal RS corresponds to the integral of the difference between the voltage signal SS and the first reference signal Vref over the sampling intervals. Since the voltage signal SS is subject to only small fluctuations during the short sampling intervals, which result from the residual ripple of the output voltage, the same is true as regards the output current Ia. Therefore, under constant load, the control signal RS is also subject to scarcely any fluctuations resulting from the residual ripple of the output voltage Ua. The sample and hold circuit, according to the invention, of the voltage control arrangement SPR substantially suppresses the periodic fluctuations in the voltage signal SS.

Further, changes in the output voltage Ua are returned undelayed to the current control assembly SRA, as explained in brief below. When the sampling intervals are very short, the voltage signal SS is approximately constant during the sampling intervals, and the voltage signal SS thus become set under constant load in such a way that the value of the voltage signal SS during the sampling intervals corresponds to the value of the first reference signal Vref. No current therefore flows to the capacitor C2, or from the capacitor C2, even during the sampling intervals; the control signal RS therefore does not change either. If the load, and therefore the output voltage Ua, changes between two sampling intervals, the difference between the voltage signal SS and the first reference value Vref changes. In the next sampling interval, a current therefore flows to the capacitor C2, or from the capacitor C2, which results in an increase or reduction in the control signal RS, which is used in the current control assembly to match the power consumption to the changed load conditions. For this reason, at most two times the length of time between two sampling intervals elapses between the change of the load conditions and the change of the control signal RS. An additional integration of the control signal, which delays the control process, is not necessary in the circuit configuration according to the invention.

In the case of longer sampling intervals, during which the voltage signal can no longer be assumed to be constant, but which are nevertheless short compared with the period of the residual ripple, the control signal RS in the voltage control arrangement according to the invention is subject to small fluctuations which vary in the range of the fluctuations in the voltage signal SS during the sampling intervals and are small compared with the fluctuations in the voltage signal SS over the full period of the residual ripple. These small fluctuations in the control signal are tolerable and likewise require no additional integration which delays the reaction time.

In order to ensure that the voltage controller SPR operates safely in the frequency range in which fluctuations of the voltage signal SS occur, the inverting input of the operational amplifier OP1 has, connected upstream of it, an RC network which in the illustrative embodiment represented in FIG. 1 is formed by the connection of a resistor R1 in parallel with a capacitor C1, and which is expediently connected in series with a voltage divider R2, R3 of the voltage measurement arrangement between the output terminals AKS, AK6 of the rectifier assembly.

FIG. 2 shows another illustrative embodiment of the circuit configuration according to the invention. In this embodiment, an RC network, which has a resistor R1' connected in parallel with a capacitor C1', is connected downstream of the operational amplifier OP1.

Instead of a subtracter, in the current control assembly SRA according to FIG. 2, an adder AD is provided which is connected upstream of the non-inverting input of the operational amplifier OP2 and which adds the output signal of the multiplier MUL to the signal that can be tapped at one terminal of the current sensing resistor RF. The way in which this current control assembly functions corresponds to the current control assembly described in FIG. 1.

In both embodiments of the circuit configuration according to the invention, fluctuations in the voltage signal which are due to the load act with only very short delays, which correspond to the time spacing of the sampling intervals, on the control signal RS fed to the current control assembly SRA, by means of which the current control assembly SPA can react virtually without delay to changes in the load.

Besides changes in the load, changes in the mains voltage $V_{mains}$ also have an effect on the DC voltage Ua and need to be compensated for by the current control assembly SRA. The circuit configuration represented in FIGS. 1 and 2 has, in his case, the advantage that, for small amplitudes of the mains voltage $V_{mains}$, the rectified-sinusoidal voltage Vn fed to the comparator K rises more slowly, by means of which the drive intervals of the operational amplifier OP1 are lengthened. As a result, the effective gain of the operational amplifier OP1, and therefore the control signal RS, increase with decreasing mains voltage $V_{mains}$. This partially compensates for the effect that the DC voltage Ua decreases quadratically with falling mains voltage $V_{mains}$. To compensate fully for this effect, or to achieve independence of the overall gain of the arrangement, a squarer $x^2$ is connected into the feedback branch of the circuit configuration according to FIG. 2.

The second reference value Vsc, which determines the switching threshold of the operational amplifier OP1, is preferably load-independent and is raised at very small loads in order that the operational amplifier OP1 is driven continuously at very small loads. The voltage signal SS has, at very small loads, only a very small ripple which has scarcely any effect in the feedback to the current control assembly.

Instead of a comparator K which makes a threshold-value decision, there is a further option for driving the operational amplifier using a component which continuously controls the proportionality factor of the operational amplifier OP1 as a function of the mains voltage $V_{mains}$, or of the rectified-sinusoidal voltage Vn dependent on the mains voltage $V_{mains}$, and thus, when the mains voltage $V_{mains}$ is low, brings about a large proportionality factor which decreases as the mains voltage $V_{mains}$ increases.

I claim:

1. A circuit configuration for providing a substantially load-independent output voltage, comprising:

a current control assembly for controlling a mains current consumption, said current control assembly having an AC voltage terminal for receiving a mains voltage and having two output terminals;

a rectifier assembly connected to said output terminals of said current control assembly, said rectifier assembly having output terminals carrying an output voltage;

a voltage measurement arrangement connected to said output terminals of said rectifier assembly, said voltage measurement arrangement having an output terminal outputting a voltage signal; and a feedback branch having a voltage control arrangement connected between said output terminal of said voltage measurement arrangement and said current control assembly for feeding the voltage signal to said current control assembly, said voltage control arrangement including a sample and hold circuit evaluating said voltage signal during sampling intervals and forming an evaluation therefrom;

said sample and hold circuit comprises an amplifier for sampling the voltage signal;

said amplifier having a first input terminal connected to the output terminal of said voltage measurement arrangement, a control input for controlling an amplification of said amplifier, and an output terminal outputting an output signal; said output signal representing said evaluation during the sampling intervals and controlling said current control assembly;

said voltage control arrangement controlling the amplification of said amplifier and having a first input terminal receiving said AC main voltage and an output terminal connected to said control input of said amplifier;

said voltage control arrangement and said amplifier setting a duration of said sampling intervals depending on said AC mains voltage upon said rectified AC mains voltage.

2. The circuit configuration according to claim 1, wherein a temporal position and a duration of the sampling intervals is dependent on the mains voltage.

3. The circuit configuration according to claim 1, wherein said duration of the sampling intervals is short compared with a period of said mains voltage.

4. The circuit configuration according to claim 1, further comprising:

a squarer connected to said feedback branch.

5. The circuit configuration according to claim 1, wherein said amplifier is an operational amplifier having a second input terminal receiving a first reference signal.

6. The circuit configuration according to claim 1, wherein said said voltage control arrangement includes a comparator with said first input terminal receiving the AC mains voltage and with a second input terminal receiving a second reference signal.

7. The circuit configuration according to claim 5, wherein said operational amplifier is an operational transconductance amplifier.

8. The circuit configuration according to claim 1, further comprising:

an RC network connected upstream of the first input terminal of said amplifier.

9. The circuit configuration according to claim 8, wherein said RC network is connected to form a part of said voltage measurement arrangement between an output terminal of said rectifier assembly and said input terminal of said operational amplifier receiving the voltage signal.

10. The circuit configuration according to claim characterized by an RC network connected downstream of the output terminal of said amplifier.

11. The circuit configuration according to claim 1, further comprising:

a capacitor connected as a holding element downstream of said output terminal of said amplifier.

12. The circuit configuration according to claim 11, wherein said capacitor is connected between the output terminal and a reference potential.

13. The circuit configuration according to claim 11, wherein said capacitor is connected in series with said RC network between the output terminal and the reference potential.

14. A switched mode power supply providing a substantially load-independent output voltage, comprising:

a current control assembly for controlling a mains current consumption, said current control assembly having an AC voltage terminal for receiving a mains voltage and having two output terminals;

a rectifier assembly connected to said output terminals of said current control assembly, said rectifier assembly having output terminals carrying an output voltage;

a voltage measurement arrangement connected to said output terminals of said rectifier assembly, said voltage measurement arrangement having an output terminal outputting a voltage signal; and a feedback branch having a voltage control arrangement connected between said output terminal of said voltage measurement arrangement and said current control assembly for feeding the voltage signal to said current control assembly, said voltage control arrangement including a sample and hold circuit evaluating said voltage signal during sampling intervals and forming an evaluation therefrom;

said sample and hold circuit forming an amplifier for sampling said voltage signal;

said amplifier having a first input terminal connected to the output terminal of said voltage measurement arrangement, a control input for controlling an amplification of said amplifier, and an output terminal outputting an output signal; said output signal representing said evaluation during the sampling intervals and controlling said current control assembly;

said voltage control arrangement controlling the amplification of said amplifier and having a first input terminal receiving said AC mains voltage, and an output terminal connected to said control input of said amplifier;

said voltage control arrangement and said amplifier setting a duration of said sampling intervals depending on said AC mains voltage upon said rectified AC mains voltage.

* * * * *